(12) United States Patent
Takemoto et al.

(10) Patent No.: US 6,659,188 B2
(45) Date of Patent: Dec. 9, 2003

(54) HAND-HELD EDGER

(75) Inventors: Kazuhiko Takemoto, Kakogawa (JP); Yoshiro Yamane, Akashi (JP); Tadao Yashirodai, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/061,912

(22) Filed: Feb. 1, 2002

(65) Prior Publication Data

US 2002/0104663 A1 Aug. 8, 2002

(30) Foreign Application Priority Data

Feb. 7, 2001 (JP) ........................................ 2001-030845

(51) Int. Cl.[7] .............................................. A01D 34/84
(52) U.S. Cl. .......................................... 172/15; 172/17
(58) Field of Search ............................... 172/15, 16, 17, 172/14, 517, 776, 126; 56/12.7, 16.7, 256, 320.1; 30/276

(56) References Cited

U.S. PATENT DOCUMENTS

| RE32,266 E | * | 10/1986 | Tuggle et al. ................. 172/15 |
| 5,165,485 A | * | 11/1992 | Fujikawa et al. .............. 172/15 |
| 5,325,928 A | * | 7/1994 | Wagster et al. ................ 172/15 |
| 5,383,330 A | * | 1/1995 | Yokocho et al. .............. 56/256 |
| 5,407,012 A | * | 4/1995 | Klopfer ........................ 172/15 |
| 5,918,683 A | * | 7/1999 | Abelsson et al. .............. 172/15 |
| 6,116,350 A | * | 9/2000 | Notaras et al. ................ 172/15 |

FOREIGN PATENT DOCUMENTS

JP 2561848 10/1997

* cited by examiner

Primary Examiner—Robert E. Pezzuto
(74) Attorney, Agent, or Firm—Kolisch Hartwell, P.C.

(57) ABSTRACT

A hand-held edger capable of suppressing wear of a cover without an increase in the number of parts. The hand-held edger comprises a main rod supported by an operator's hand; a gear case supported at one end portion of the main rod; a rotating blade connected to a gear in the gear case; a power unit mounted to the other end portion of the main rod, for driving the rotating blade via the gear in the gear case; a resin-made cover attached to a flange of the gear case, for covering the rotating blade; and a wheel supported by the cover, and an outer periphery of the flange is coplanar with the periphery of at least the lowermost portion of the cover or diametrically outwardly protruded therefrom.

9 Claims, 5 Drawing Sheets

HAND-HELD EDGER

BACKGROUND OF THE INVENTION

1. Field of the Invention

The present invention relates to a hand-held edger mainly used for mowing edges of grasses.

2. Description of the Related Art

Conventionally, a hand-held edger comprises a main rod supported by an operator's hand, a gear case provided at one end portion of the main rod, an output shaft horizontally protruded from the gear case, and a rotating blade supported by the output shaft. The rotating blade is driven by a power unit such as an engine mounted on the other end portion of the main rod via a gear in the gear case. A resin-made cover is attached to a flange of the gear case, for covering the rotating blade, and the wheel is supported by the cover. When edges of grasses are mowed by the hand-held edger, the main rod is operated by the operator's hand to make the cover and the gear case suitably distant from the ground with which the wheel as a point of support is in contact. In this state, the center of rotation of the rotating blade is held in parallel with the ground and the rotating blade is driven to be rotated around the center of rotation, thereby mowing edges of grasses or the like.

However, in the conventional hand-held edger, a lower peripheral portion of the resin-made cover is worn out due to friction between the cover and the ground during the mowing operation. This is due to the fact that it is difficult to keep the cover apart from the ground while maintaining the wheel as the point of support all the time during the mowing operation. Accordingly, to prevent such wear of the cover, there has been proposed a hand-held edger in which a ground guiding member having a curved ground face made of a wear-resistant material is provided under a lower face of the gear case (Japanese Utility Model Application No. 2561848). However, in the hand-held edger having such constitution, dedicated fixing means for mounting the ground guiding member is needed and the number of parts is correspondingly increased.

SUMMARY OF THE INVENTION

The present invention addresses the above-described condition, and an object of the present invention is to provide a hand-held edger capable of preventing wear of a cover without an increase in the number of parts.

To achieve the above object, according to the present invention, there is provided a hand-held edger comprising: a main rod supported by an operator's hand; a gear case supported at one end portion of the main rod; a rotating blade connected to a gear in the gear case; a power unit mounted to the other end portion of the main rod, for driving the rotating blade via the gear in the gear case; a resin-made cover attached to a flange of the gear case, for covering the rotating blade; and a wheel supported by the cover, wherein a protruded portion having an outer periphery coplanar with a periphery of at least a lowermost portion of the cover or diametrically outwardly protruded therefrom is formed at an outer periphery of the gear case.

In the hand-held edger, since the outer periphery of the protruded portion formed at the outer periphery of the gear case is coplanar with the periphery of at least the lowermost portion of the resin-made cover or is diametrically outwardly protruded therefrom, the outer periphery of the protruded portion of the gear case is in contact with the ground. Consequently, the wear of the cover can be suppressed without an increase in the number of parts.

It is preferable that in the hand-held edger, the protruded portion of the gear case is comprised of the flange, because the protruded portion for suppressing the wear of the cover can be formed at the gear case with a simple structure.

Preferably, the hand-held edger further comprises: an annular cover pressing plate and a fastening member, the cover is attached to the flange by means of the fastening member with the cover interposed between the flange of the gear case and the plate, and an outer periphery of the plate is coplanar with a periphery of at least a lowermost portion of the cover or is diametrically outwardly protruded therefrom.

In the hand-held edger so constituted, since the outer periphery of the cover pressing plate, as well as the outer periphery of the flange of the gear case, is coplanar with the periphery of at least the lowermost portion of the resin-made cover or is diametrically outwardly protruded therefrom, the wear of the cover can be more reliably prevented. In addition, since the annular plate is used as a fastening seat of the fastening member, a fastening force can be increased.

It is preferable that in the hand-held edger, the gear case is made of aluminum, because the wear prevention effect of the cover by the flange of the gear case can be further improved.

According to the present invention, there is also provided a hand-held edger comprising: a main rod supported by an operator's hand; a gear case supported at one end portion of the main rod; a rotating blade connected to a gear in the gear case; a power unit mounted to the other end portion of the main rod, for driving the rotating blade via the gear in the gear case; a resin-made cover attached to the gear case, for covering the rotating blade; and a wheel supported by the cover, wherein the cover has a reinforcement plate embedded therein and an outer periphery of a portion of the reinforcement plate which corresponds to a lower portion of the cover is close to a periphery of the lower portion of the cover.

In the hand-held edger so constituted, since the outer periphery of the portion of the reinforcement plate embedded in the cover, which corresponds to the lower portion of the cover, is close to the periphery of the lower portion of the cover, the outer periphery of the reinforcement plate makes contact with the ground when the lower portion of the cover is slightly worn out by the friction between the ground and the cover. Consequently, significant wear of the cover can be avoided without an increase in the number of parts.

In is preferable that in the hand-held edger, a first insertion hole for fastening the cover and the gear case and a second insertion hole for fastening the cover and a support member of the wheel are formed in the reinforcement plate, and the cover and the gear case, and the cover and the support member of the wheel are respectively fastened by means of fastening members respectively inserted through the first and second insertion holes.

This is because in the hand-held edger so constituted, the cover can be firmly attached to the gear case and the wheel can be firmly supported by the cover by means of the reinforcement plate.

The above and further objects and features of the invention will more fully be apparent from the following detailed description with accompanying drawings.

Hereinafter, a preferred embodiment of the present of the present invention will be described with reference to drawings.

DETAILED DESCRIPTION OF THE PREFERRED EMBODIMENT

Figure 1:
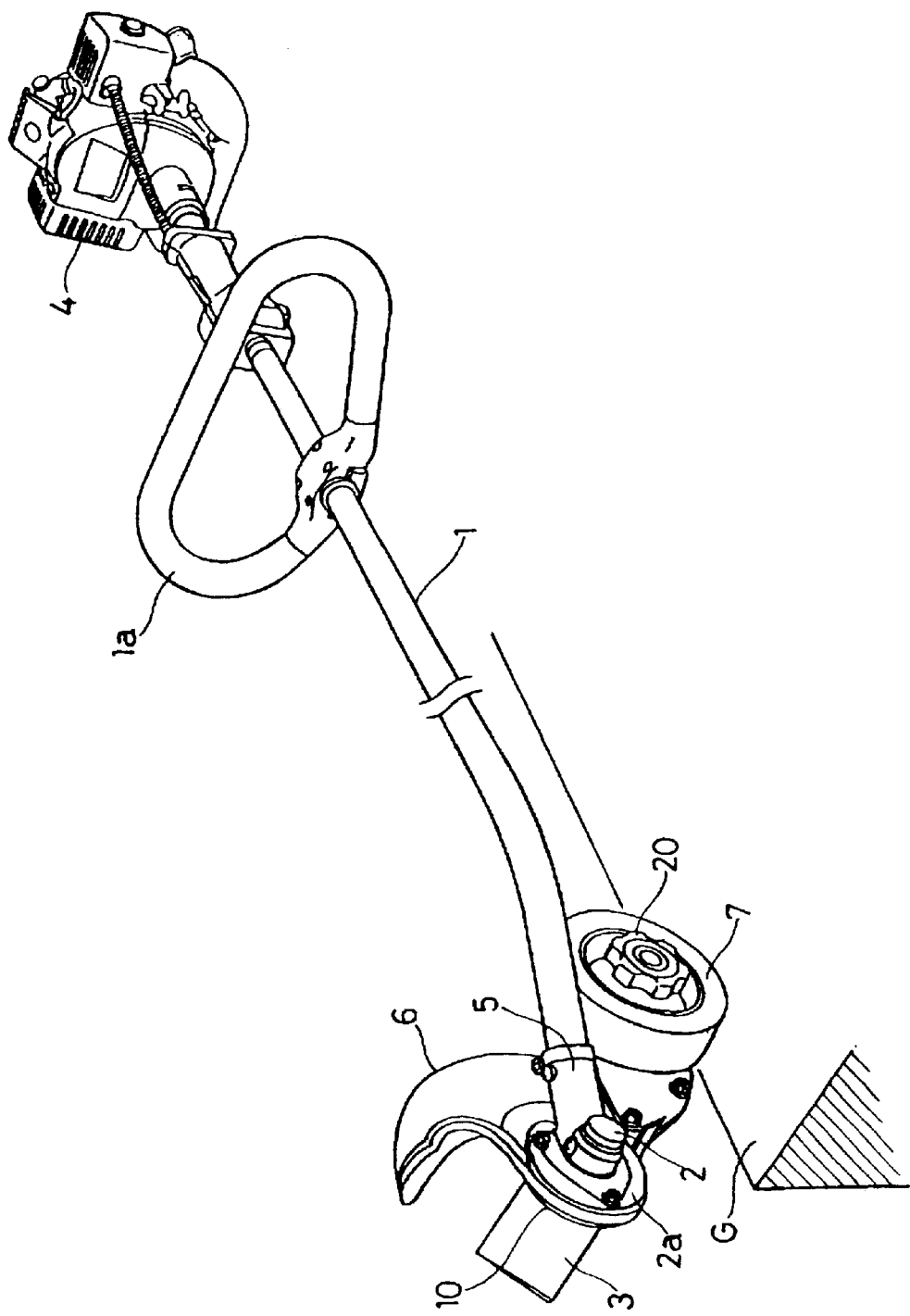
FIG. 1 is a perspective view showing a hand-held edger according to an embodiment of the present invention, with a cover partly broken.
Figure 2:
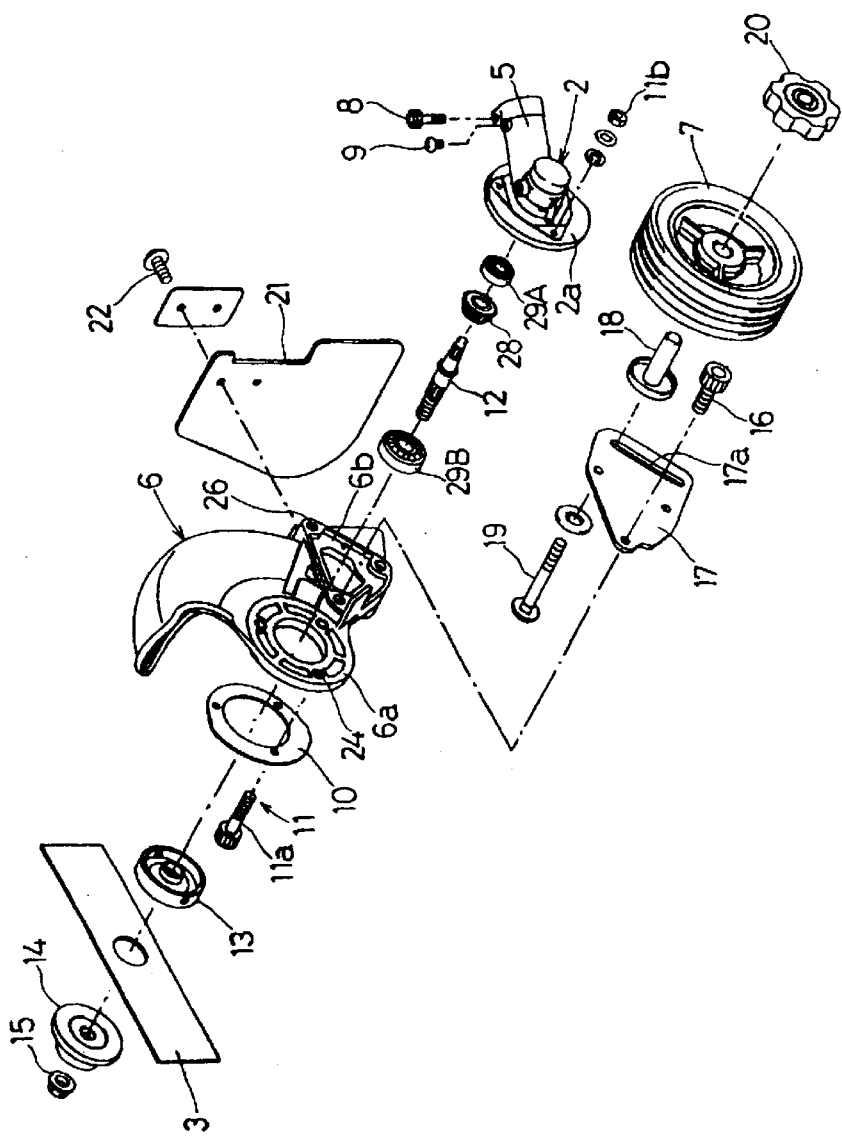
FIG. 2 is an exploded perspective view showing a structure of a rotating blade side of the hand-held edger of FIG. 1.
Figure 3:
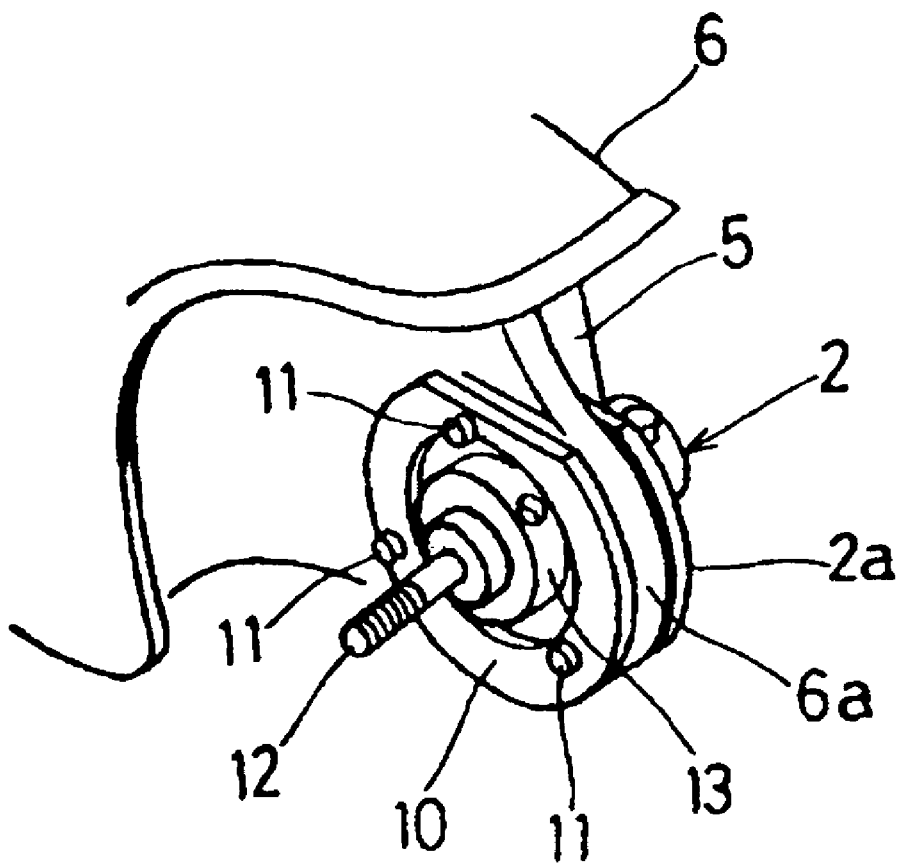
FIG. 3 is a perspective view showing a state before the rotating blade having the structure of FIG. 2 is attached.

Referring now to FIG. 1, there is shown a hand-held edger used for mowing edges of grasses at peripheries of grasses or the like. The hand-held edger has a main rod 1 to be supported by an operator's hand. A gear case 2 is provided at one end (right side in FIG. 1) corresponding to a front side of the main rod 1. A rotating blade 3 is attached to an output shaft 12 (see FIG. 2) supported by the gear case 2. A holding portion 1a is mounted to an intermediate portion of the main rod 1. A power unit 4 such as an engine is mounted to the other end (left side in FIG. 1) corresponding to a rear side of the main rod 1. The power unit 4 is adapted to drive the rotating blade 3 via a gear 28 (FIG. 2) in the gear case 2 and the output shaft 12 (FIG. 2). The resin-made cover 6 is attached to the flange 2a formed integrally with the gear case 2 to cover the rotating blade 3, and a wheel 7 is supported by the cover 6.

As shown in FIG. 2, the cover 6 has a side face of a general sector-form shape. A boss portion 6a that is circular seen in a side view is provided at a lower portion of a front portion of the cover 6. The gear case 2 is made of aluminum and generally cylindrical. The flange 2a for mounting the cover 6 is integrally formed at a side end portion of the gear case 2. An outer diameter of the flange 2a is equal to or slightly larger than an outer diameter of the boss portion 6a of the cover 6. Thereby, an outer periphery of the flange 2a is coplanar with the lower portion of the front portion of the cover 6 or slightly protruded diametrically outwardly (downwardly). A connecting tubular portion 5 is provided integrally with the gear case 2 for mounting one end portion of the main rod 1. The one end portion of the main rod 1 inserted through the connecting tubular portion 5 is fastened to the connecting tubular portion 5 by means of fastening members 8, 9 such as bolts.

An annular cover pressing plate 10 comprised of a metal plate such as a steel plate is placed on the side face of the cover 6 on the opposite side of the gear case 2. In the state in which the boss portion 6a of the cover 6 is interposed between the plate 10 and the flange 2a of the gear case 2, the cover 6 is attached to the flange 2a of the gear case 2 by means of a fastening member 11 comprised of a bolt 11a to be inserted through the cover 6 and the flange 2a and a nut 11b. An outer diameter of the plate 10 is set equal to or slightly larger than that of the boss portion 6a of the cover 6. Therefore, when the hand-held edger is assembled, the outer periphery of the plate 10 is coplanar with the lower portion of the front portion of the cover 6 or slightly protruded diametrically outwardly (downwardly). In some cases, the plate 10 may be replaced by a washer through which the fastening member 11 is inserted.

The output shaft 12 extending horizontally from the gear case 2 toward the boss 6a of the cover 6 is rotatably supported by the gear case 2 by bearings 29A, 29B mounted in the gear case 2. The rotating blade 3 is fastened to the output shaft 12 via a collar 13 by means of a cap 14, a nut 15, or the like.

A wheel mounting portion 6b is formed at a rear portion of the cover 6. A support plate 17 is mounted to the wheel mounting portion 6b by means of a fastening member 16. A slit 17a through which a bolt 19 for supporting an axle 18 of the wheel 7 is inserted is formed in the support plate 17. The axle 18 and the wheel 7 rotatably provided at the outer periphery thereof are mounted to the support plate 17 by means of the bolt 19 penetrating through the inside of the axle 18 and the nut 20. A shield plate 21 covering a rear side of the rotating blade 3 is fastened to a rear face of the cover 6 by means of a screw 22.

In an edge mowing operation by the hand-held edger, the holding portion 1a of the main rod 1 of FIG. 1 is supported by the operator's hand and the rotating blade 3 is rotated by the power unit 4 while keeping the cover 6 and the gear case 2 suitably distant from the ground G with which the wheel 7 as the point of support is in contact, thereby mowing the grasses or the like.

In the hand-held edger, the outer periphery of the flange 2a of the aluminum-made gear case 2 having wear resistance higher than that of the resin-made cover 6 is coplanar with the periphery of the lowermost portion of the cover 6 or diametrically outwardly therefrom. Therefore, when the lower portion of the cover 6 makes contact with the ground G and friction between them is generated, the wear of the cover 6 can be suppressed. Also, since the conventional wear-proof member or an additional fastening member for mounting the wear-proof member can be dispensed with, the number of parts can be correspondingly reduced.

In this embodiment, the flange 2a of the gear case 2 serves as the wear-proof protruded portion of the cover 6 coplanar with the lowermost portion of the cover 6 or diametrically protruded therefrom. Alternatively, a protruded portion different from the flange 2a and coplanar with the lowermost portion of the cover 6 or diametrically protruded therefrom may be provided at the outer periphery of the gear case 2.

Also, in the hand-held edger of this embodiment, the outer periphery of the cover pressing plate 10 of FIG. 2 is coplanar with the periphery of the lowermost portion of the cover 6 or diametrically outwardly protruded therefrom. Therefore, the wear of the cover 6 can be more reliably suppressed. In addition, since the annular pressing plate 10 is used as a fastening seat of the fastening member 11, a fastening force of the fastening member 11 can be increased.

The outer periphery of the flange portion 2a of the gear case 2 and the outer periphery of the plate 10 need to be coplanar with the periphery of at least the lowermost portion of the cover 6, in this embodiment, the periphery of at least the lowermost portion of the boss portion 6a, or be diametrically outwardly protruded therefrom.

Figure 4:
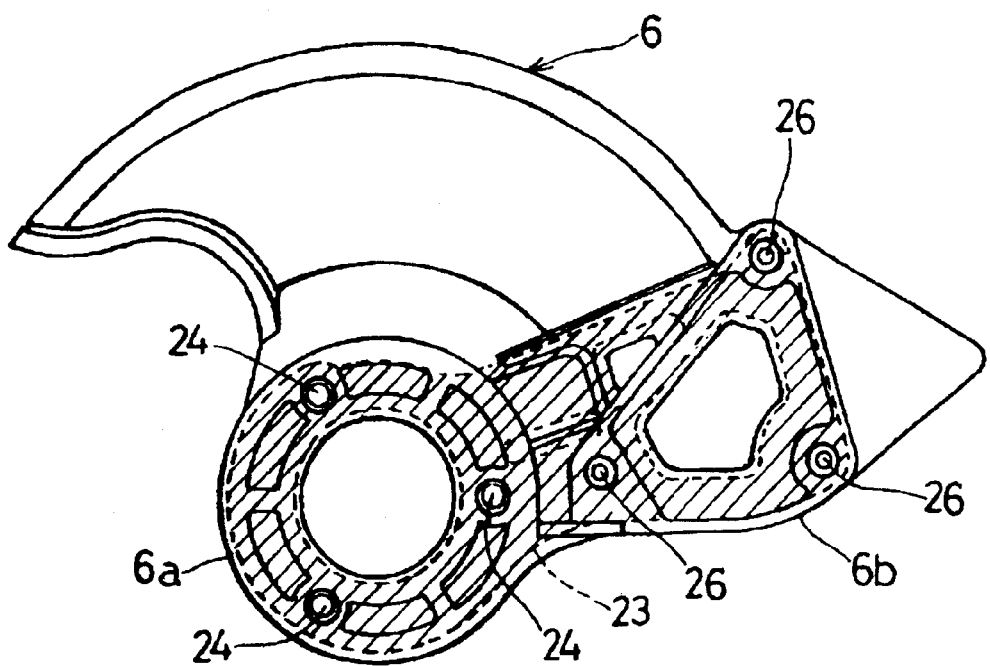
FIG. 4 is a side view showing a cover of a hand-held edger according to another embodiment of the present invention.
Figure 5:
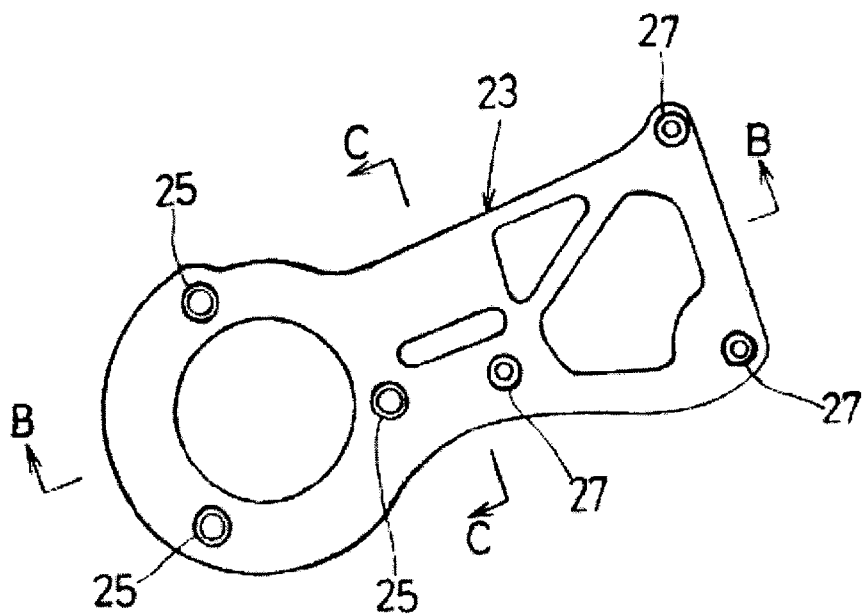
FIG. 5A is a plan view showing a reinforcement plate embedded in the cover.
FIG. 5B is a cross-sectional view taken along line B—B of FIG. 5A.
FIG. 5C is a cross-sectional view taken along line C—C of FIG. 5A.
Figure 5:
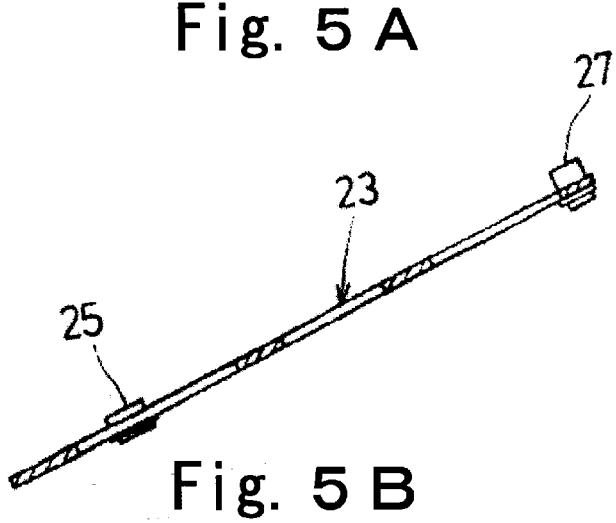
Figure 5:
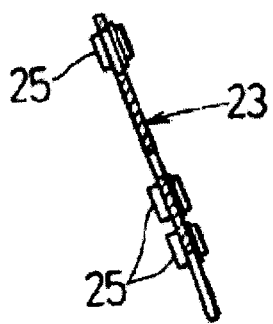

As shown in oblique lines of FIG. 4, a reinforcement plate 23 is embedded in the resin-made cover 6. The reinforcement plate 23 is comprised of a metal plate, for example, a steel plate, and has a shape shown in FIG. 5A. As shown in FIG. 4, the reinforcement plate 23 has a front portion corresponding to the boss portion 6a of the cover 6 and a rear portion corresponding to the wheel mounting portion 6b. The front portion of the reinforcement plate 23 corresponding to the boss portion 6a is of a circular arc shape having an outer diameter slightly smaller than an outer diameter of the boss portion 6a of the cover 6. In other words, the outer periphery of the front portion of the reinforcement plate 23 corresponding to the lower portion of the cover 6 is slightly inward of the periphery of the lower portion of the cover 6 and is close to this periphery. As can be clearly shown in FIG. 4 and FIGS. 5B, 5C, the reinforcement plate 23 is provided with tubular members 25, 27. The tubular member 25 forms an insertion hole 24 (see FIG. 2) of the fastening member 11 for attaching the cover 6 to the flange 2a. The tubular member 27 forms an insertion hole 26 (see FIG. 2) of the fastening member 16 for attaching the support plate 17 to the wheel mounting portion 6b. With this constitution, since the fastening members 11, 16 for fastening the gear case 2 and the wheel 7 are inserted through the reinforcement plate 23, the cover 6 can be firmly attached to the gear case 2 and the wheel 7 can be firmly supported by the cover 6.

As should be understood, since the outer periphery of the front portion of the reinforcement plate 23 embedded in the cover 6, which corresponds to the lower portion of the cover 6, is close to the periphery of the lower portion of the cover 6, significant wear of the cover 6 can be avoided because the outer periphery of the reinforcement plate 23 is in contact with the ground G, when slight wear is caused by the friction between the lower portion of the cover 6 and the ground G.

In some cases, the reinforcement plate 23 need not be used. Or otherwise, when the reinforcement plate 23 is used, the outer diameter of the flange 2a and the outer diameter of the plate 10 can be reduced to be diametrically inward of the outer periphery of the lower portion of the cover 6.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such meters and bounds thereof are therefore intended to be embodied by the claims.

What is claimed is:

1. A hand-held edger comprising:
   a main rod configured to be supported by an operator's hand;
   a gear case supported at one end portion of the main rod, the gear case having a protruded portion;
   a rotating blade connected to an output shaft extending from the gear case;
   a power unit mounted to an opposite end portion of the main rod, the power unit being configured to drive the output shaft and the rotating blade;
   a resin-made cover coupled to the gear case, the cover at least partially covering the rotating blade, the cover having a boss portion for securing the cover to the gear case, the boss portion being formed so as to surround the output shaft, the boss portion including a lower portion positioned between the output shaft and a ground surface during use; and
   a wheel mounted to the cover, wherein
      the protruded portion of the gear case has an outer periphery that is coextensive with, or protruding relative to, an outer periphery of the lower portion of the boss portion.

2. The hand-held edger according to claim 1, wherein the protruded portion of the gear case is formed as a portion of a flange that connects the gear case to the cover.

3. The hand-held edger according to claim 2, further comprising:
   an annular cover pressing plate and a fastening member, wherein
      the cover is attached to the flange via the fastening member with the cover interposed between the flange of the gear case and the plate, and wherein
      an outer periphery of the plate is coextensive with, of protruding relative to, a periphery of at least the lower portion of the boss portion of the cover.

4. The hand-held edger according to claim 1, wherein the gear case is made of aluminum.

5. The hand-held edger according to claim 2, wherein the flange has a substantially circular-arc shaped lower end portion.

6. A hand-held edger comprising:
   a main rod configured to be supported by an operator's hand;
   a gear case positioned at one end portion of the main rod;
   a rotating blade connected to and output shaft extending from the gear case;
   a power unit mounted to an opposite end portion of the main rod, the power unit being configured to drive the output shaft and rotating blade;
   a resin-made cover attached to the gear case, the cover being adapted to at least partially cover the rotating blade, the cover having a boss portion for securing the cover to the gear case, the boss portion being formed at a lower portion of the cover so as to surround the output shaft; and
   a wheel mounted to the cover;
   a metal reinforcement plate embedded in the cover, wherein,
      a lower periphery of the metal reinforcement plate is positioned adjacent an outer periphery of a lower portion of the boss portion.

7. The hand-held edger according to claim 6, wherein the cover has a wheel mounting portion at a rear part thereof, the metal reinforcement plate extending from the boss portion to the wheel mounting portion, wherein a first insertion hole for fastening the cover and the gear case and a second insertion hole for fastening the cover and a support member of the wheel are formed in the reinforcement plate, and wherein the cover and the gear case, and the cover and the support member of the wheel are respectively fastened via fastening members respectively inserted through the first and second insertion holes.

8. The hand-held edger according to claim 7, wherein the first insertion hole and the second insertion hole are each comprised of a tubular member formed integrally with the metal reinforcement plate so as to penetrate the cover.

9. A hand-held edger, comprising:
   a main rod having a power unit positioned adjacent a first end, the power unit being operatively connected to a gear case positioned adjacent a second end of the main rod, the gear case having an output shaft configured to drive a rotating blade;
   a cover coupled to the gear case, the cover being configured to at least partially cover the blade during rotation, a portion of the cover surrounding the output shaft, such that a lower portion of the cover is positioned intermediate the output shaft and a ground surface during operation;

a wheel mounted to the cover, the wheel being configured to support the edger when placed against a ground surface, such that the lower portion of the cover is adjacent the ground surface during operation; and a flange positioned intermediate the gear case and cover, an outer periphery of the flange being formed to be coextensive with, or protruding relative to, an outer periphery of the lower portion of the cover.

* * * * *